(12) United States Patent
Shin et al.

(10) Patent No.: US 11,312,206 B2
(45) Date of Patent: Apr. 26, 2022

(54) METHOD FOR DETERMINING HEATING LOAD OF HYBRID ELECTRIC VEHICLE

(71) Applicants: HYUNDAI MOTOR COMPANY, Seoul (KR); KIA MOTORS CORPORATION, Seoul (KR)

(72) Inventors: Dong Jun Shin, Hwaseong-si (KR); Jae Yun Shim, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 269 days.

(21) Appl. No.: 16/572,132

(22) Filed: Sep. 16, 2019

(65) Prior Publication Data
US 2020/0215869 A1   Jul. 9, 2020

(30) Foreign Application Priority Data
Jan. 7, 2019   (KR) .......................... 10-2019-0001504

(51) Int. Cl.
| | |
|---|---|
| *B60H 1/00* | (2006.01) |
| *B60H 1/12* | (2006.01) |
| *B60L 58/15* | (2019.01) |
| *B60L 58/25* | (2019.01) |
| *B60W 40/06* | (2012.01) |

(52) U.S. Cl.
CPC ......... *B60H 1/004* (2013.01); *B60H 1/00899* (2013.01); *B60H 1/12* (2013.01); *B60L 58/15* (2019.02); *B60L 58/25* (2019.02); *B60W 40/06* (2013.01); *B60W 2555/20* (2020.02); *B60W 2710/0666* (2013.01)

(58) Field of Classification Search
None
See application file for complete search history.

(56) References Cited

U.S. PATENT DOCUMENTS

| | | | |
|---|---|---|---|
| 8,346,422 B2 * | 1/2013 | Chen .................... | B60H 1/0075 701/22 |
| 10,632,818 B2 * | 4/2020 | Wrobel .............. | B60H 1/00771 |
| 10,717,339 B2 * | 7/2020 | Chevers ............ | B60H 1/00885 |

FOREIGN PATENT DOCUMENTS

KR    10-2012-0131929 A    12/2012

* cited by examiner

*Primary Examiner* — Todd Melton
(74) *Attorney, Agent, or Firm* — Morgan, Lewis & Bockius LLP (57) ABSTRACT

A method for determining a heating load of a hybrid electric vehicle includes determining an SOC of a high-voltage battery through a controller, determining whether or not there is a heating request, based on a travel pattern input, through the controller when the SOC of the high-voltage battery is normal, calculating a required heating load according to the travel pattern input when there is the heating request, calculating an environmental condition according to an environment of the vehicle when there is the heating request, calculating a final heating load value through a combination of the calculated required heating load and the environmental condition of the vehicle, and adjusting a basic request engine torque according to the travel pattern input, taking into consideration the calculated final heating load value, and controlling driving of an engine based on the adjusted basic request engine torque.

10 Claims, 4 Drawing Sheets

FIG. 1

--RELATED ART--

FIG. 2

--RELATED ART--

Step 1 Determined Value

|  |  | Heating Low ← Load → High | | |
|---|---|---|---|---|
|  |  | 1 | 2 | 3 |
| Step 1 Determined Value | Cold<br>｜<br>Vehicle<br>Condition<br>｜<br>Hot | | | |
| | 0 | 2 | 2 | 1 |
| | 1 | 2 | 2 | 2 |
| | 2 | 3 | 3 | 2 |
| | 3 | 3 | 3 | 3 |
| | 4 | 3 | 3 | 3 |

FIG. 5

METHOD FOR DETERMINING HEATING LOAD OF HYBRID ELECTRIC VEHICLE

CROSS-REFERENCE TO RELATED APPLICATION

This application claims the benefit of priority to Korean Patent Application No. 10-2019-0001504 filed on Jan. 7, 2019 with the Korean Intellectual Property Office, the entire contents of which are incorporated herein by reference.

TECHNICAL FIELD

The present disclosure relates to a method for determining a heating load of a hybrid electric vehicle, and more particularly to a method for determining a heating load of a hybrid electric vehicle, in which the vehicle is controlled based on a target engine torque calculated in accordance with a final heating load value calculated based on a required heating load calculated taking into consideration operation states of air conditioning configurations installed in the vehicle and a vehicle environmental condition value calculated taking into consideration a travel environmental condition of the vehicle.

BACKGROUND

In general, vehicles are equipped with a heating, ventilation and air conditioning (HVAC) system for controlling room temperature and creating a more pleasant room environment.

Recently, a fully automatic temperature control (FATC) system has also been applied to most vehicles. The FATC system automatically controls indoor temperature in accordance with a temperature set by a driver or a passenger and, as such, maintains a pleasant indoor environment.

When the user sets a temperature, the FATC system determines a discharge mode, a discharge temperature, a discharge direction, a discharge flow amount, etc., taking into consideration an air conditioning load corresponding to the set temperature.

In addition, an air-conditioning controller receives detected values from a discharge temperature sensor for detecting a discharge temperature, a heater temperature sensor for detecting a temperature of an electric heater (for example, a positive temperature coefficient (PTC) heater), an evaporator temperature sensor for detecting a temperature of an evaporator, etc., and controls operating elements such as a mode actuator, a temperature door (a temperature control door) actuator, an air flow direction control door actuator, an air conditioning blower, a compressor, and an electric heater, to control supply of air for air conditioning in accordance with the determined discharge mode, the determined discharge temperature, the determined discharge direction, and the determined discharge air flow amount, and, as such, controls indoor temperature and operation of the system.

Meanwhile, a hybrid electric vehicle is an eco-friendly vehicle which is driven using an engine and an electric motor (driving motor) as driving sources and, as such, may achieve a reduction in exhaust gas and an enhancement in air-fuel ratio in that the vehicle utilizes electric energy along with energy of fossil fuels for driving thereof.

In the hybrid electric vehicle, however, operation of an air conditioner is carried out in such a manner that, when an air conditioning load is calculated in accordance with a temperature set by the user, an increase in the driving output of the engine is simply carried out in accordance with the calculated air conditioning load. That is, in an engine ON state of the hybrid electric vehicle, the engine is controlled to be in an idle state in accordance with the related art.

Figure 1:
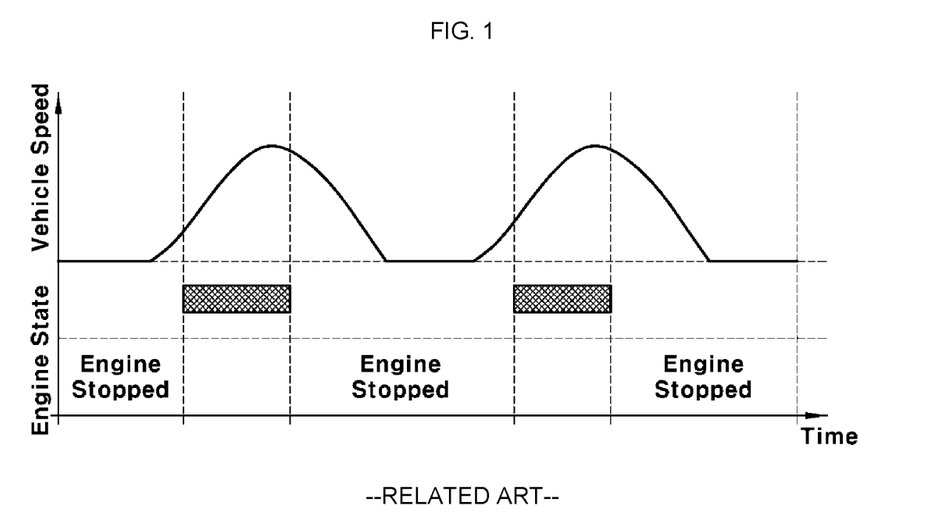
FIG. 1 is a graph depicting an engine ON state for driving of a hybrid electric vehicle in accordance with the related art.
Figure 2:
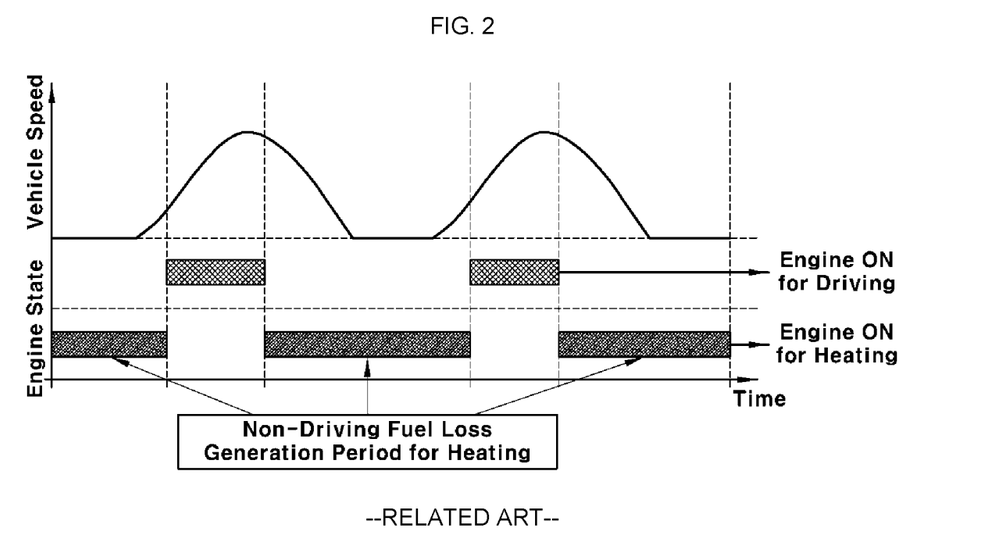
FIG. 2 is a graph depicting an engine ON state for heating of a hybrid electric vehicle in accordance with the related art.

As shown in FIG. 1, the engine is stopped under the condition that engine driving is unnecessary, as in an electric vehicle (EV) driving state or a stopped state. However, when heating is needed in winter, the engine is switched to an ON state for heating even under the condition that engine driving is unnecessary, as shown in FIG. 2.

In the related art, however, the output of the engine is not appropriately determined, taking into consideration a travel situation or a travel environment, but is determined only to satisfy desired heating performance. For this reason, there may be a problem in that the state of charge (SOC) of a battery may become overcharge (SOC overcharge) during travel of the vehicle on a road in winter. Furthermore, there may be a problem of deterioration in the air-fuel ratio caused by frequent maintenance of the engine ON state.

The above information disclosed in this Background section is only for enhancement of understanding of the background of the present disclosure and therefore it may contain information that does not form the prior art that is already known in this country to a person of ordinary skill in the art.

SUMMARY

The present disclosure has been made in an effort to solve the above-described problems associated with the prior art.

The present disclosure relates to a method for determining a heating load of a hybrid electric vehicle, in which an engine torque is calculated based on a state of charge (SOC) of a high-voltage battery, a travel pattern, and a final heating load value, in order to take into consideration the air-fuel ratio of the vehicle.

The present disclosure also relates to a method for determining a heating load of a hybrid electric vehicle, in which a final heating load value is calculated through calculation of a required heating load and combination of the calculated required heating load with an environment of the vehicle, in order to provide a heating load meeting the request of the user.

The present disclosure also relates to a method for determining a heating load of a hybrid electric vehicle, in which the heating load requested by the user is accurately calculated in order to accurately reflect a required engine torque value.

According to one aspect of the present disclosure, a method for determining a heating load of a hybrid electric vehicle, may include steps of determining, by a controller, a state of charge (SOC) of a high-voltage battery, determining, by the controller, whether or not there is a heating request, based on a travel pattern input, when the SOC of the high-voltage battery is normal, calculating, by the controller, a required heating load according to the travel pattern input when it is determined that there is a heating request, calculating, by the controller, an environmental condition according to an environment of the vehicle when it is determined that there is a heating request, calculating, by the controller, a final heating load value based on a combination of the calculated required heating load and the environmental condition of the vehicle, and adjusting, by the controller, a basic request engine torque determined by the travel pattern input, based on the calculated final heating load value, and controlling driving of an engine in response to the adjusted basic request engine torque.

In a preferred exemplary embodiment, in the step of calculating the environmental condition according to the environment of the vehicle, the environmental condition may be calculated based on a combination of a cooling water temperature of the engine, a solar radiation quantity, and outdoor temperature of the vehicle.

The blower step may be configured to control the controlled air flow amount to be discharged into a passenger compartment, and the temperature door may be configured to control an amount of high-temperature air heated through the heater core and an amount of low-temperature air introduced from outside of the vehicle.

In another preferred exemplary embodiment, in the step of calculating the required heating load, the required heating load may be calculated based on a controlled air flow amount through a blower step and an opening angle of a temperature door.

In still another exemplary preferred embodiment, in the step of calculating the final heating load value through the combination of the calculated required heating load and the environmental condition of the vehicle, the required heating load and the environmental condition of the vehicle may be combined to constitute a map table.

In yet another exemplary preferred embodiment, the final heating load value may be determined in the map table by using the required heating load as a column factor and using the environmental factor as a row factor.

In still yet another exemplary preferred embodiment, the basic request engine torque determined by the travel pattern input may be calculated based on at least one of a consumed electric power amount of an auxiliary battery, an acceleration desire of a user, a travel load, and an average speed of the vehicle.

In still yet another preferred embodiment, the heating request may be determined to be present when a difference between outdoor temperature of the vehicle and a set temperature of a fully automatic temperature control (FATC) unit is greater than a predetermined value.

In still yet another preferred embodiment, the controller may include a fully automatic temperature control (FATC) unit, an engine management system (EMS), and a hybrid control unit (HCU).

In still yet another preferred exemplary embodiment, the method may further include calculating a target engine torque value according to the SOC of the high-voltage battery when the SOC of the high-voltage battery is determined to be abnormal in the step of determining the SOC of the high-voltage battery.

In still yet another preferred exemplary embodiment, the method may further include calculating a target engine torque value according to the SOC of the high-voltage battery when it is determined that there is no heating request in the step of determining whether or not there is a heating request.

Other aspects and preferred exemplary embodiments of the present disclosure are discussed infra.

It is understood that the terms "vehicle", "vehicular" and other similar terms as used herein are inclusive of motor vehicles in general such as passenger automobiles including sport utility vehicles (SUV), buses, trucks, various commercial vehicles, watercraft including a variety of boats and ships, aircraft, and the like, and includes hybrid electric vehicles, electric vehicles, plug-in hybrid electric vehicles, hydrogen-powered vehicles and other alternative fuel vehicles (e.g. fuels derived from resources other than petroleum). As referred to herein, a hybrid electric vehicle is a vehicle that has two or more sources of power, for example both gasoline-powered and electric-powered vehicles.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

It should be understood that the appended drawings are not necessarily to scale, presenting a somewhat simplified representation of various preferred features illustrative of the basic principles of the present disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will be made in detail to various exemplary embodiments of the present disclosure, examples of which are illustrated in the accompanying drawings and described below. However, the present disclosure may be embodied in many different forms and should not be construed as limited to the exemplary embodiments set forth herein. Rather, these exemplary embodiments are provided so that this disclosure will be thorough and complete, and will fully convey the scope of the disclosure to those skilled in the art.

In addition, terms such as " . . . unit" or the like refer to a unit for processing at least one function or operation, and this unit may be implemented as hardware, software or a combination of hardware and software.

In addition, terms referred to as "calculation", "output", etc. in the specification of the present disclosure include factor values taken into consideration for driving of a driving unit. Such factor values include all values processed through a plurality of constituent elements included in a controller.

Furthermore, although numerical values are defined by indexes in the specification of the present disclosure, the indexes are not limited to the associated numerical values.

Such indexes may be applied to different numerical values in order to express degrees of the numerical values.

The present disclosure relates to a method for determining a heating load of a vehicle, and discloses a configuration for calculating a required heating load and calculating a final heating load value based on the calculated required heating load, taking environmental factors of the vehicle into consideration, when heating is required in response to a travel pattern input generated at the request of the user.

Furthermore, a target torque of an engine 100 may be calculated based on the final heating load value calculated as described above. In connection with this, the present disclosure discloses a technology for performing driving of the engine 100 in accordance with the calculated target torque.

Figure 3:
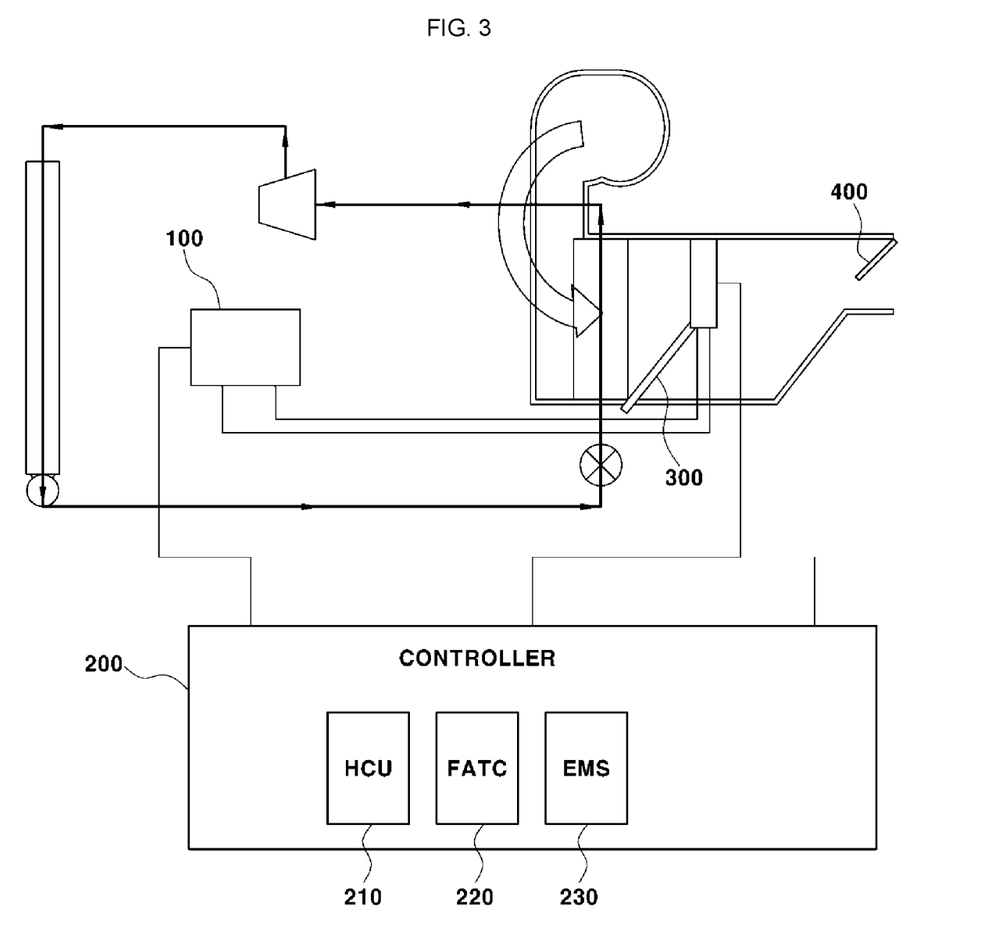
FIG. 3 is a block diagram illustrating combination relation of configurations for executing a method for determining a heating load in a hybrid electric vehicle in accordance with an exemplary embodiment of the present disclosure.

FIG. 3 is a block diagram illustrating a combination of configurations for performing determination of a heating load in a hybrid electric vehicle in accordance with an exemplary embodiment of the present disclosure.

As illustrated in FIG. 3, the hybrid electric vehicle is equipped with the engine 100, which is usable as a heat source during heating, and, as such, is configured to achieve heat exchange between air (indoor air or outdoor air) and cooling water used to cool the engine 100 at high temperature. In this case, cold air is heated while passing through a heater core, and is then supplied to an interior of the vehicle and, as such, heating is achieved.

A temperature door 300 is used for control of indoor temperature. Adjustment of a discharge temperature is achieved through control of the position and opening degree of the temperature door 300. Furthermore, a controlled air flow amount is controlled in accordance with the user's request by controlling a blower step 400 for controlling a controlled air flow amount to be discharged into a passenger compartment.

As illustrated in FIG. 3, cooling water heated by the engine 100 heats the heater core. The temperature door 300 functions to control the amount of high-temperature air heated through the heater core and the amount of low-temperature air introduced from the outside of the vehicle.

A controller 200 is configured to calculate a required heating load according to user input when heating is required in accordance with the user input, and to calculate environmental conditions according to an environment of the vehicle.

In addition, the controller 200 is configured to calculate a final heating load value through a combination of the calculated required heating load and the calculated vehicle environmental conditions. The controller 200 is also configured to control the engine 100 in accordance with a torque of the engine 100 predetermined taking the calculated final heating load value into consideration.

Preferably, the controller 200 in the present disclosure includes a fully automatic temperature control (FATC) unit (hereinafter, referred to as "FATC") for controlling constituent elements of an air conditioner installed in the hybrid electric vehicle, an engine management system (EMS) (hereinafter, referred to as "EMS") configured to control driving of the engine 100 and ON/OFF of the engine 100, and a hybrid control unit (HCU) (hereinafter, referred to as "HCU") configured to control a motor and a hybrid starter generator (HSG) of the hybrid electric vehicle.

The EMS designated by reference numeral "230" performs a control operation to drive the engine 100 in accordance with the calculated required torque of the engine 100, and a control operation to generate ignition of the engine 100 in accordance with an ON/OFF time of the engine 100.

Meanwhile, the HCU designated by reference numeral "210" determines whether or not the state of charge (SOC) of a high-voltage battery (not shown) is a normal state, and whether or not a heating load is required based on a travel pattern input value from the user.

When the HCU 210 determines that there is a travel request requiring a heating load, the FATC designated by reference numeral "220" calculates load values predetermined by the blower step 400 and the temperature door 300.

The required heating load to be calculated through the FATC 220 may be predetermined in accordance with steps for control of the blower step 400 and control of the temperature door 300. In an exemplary embodiment of the present disclosure, control of each of the blower step 400 and the temperature door 300 are divided into two steps.

The following Table 1 illustrates control steps for calculating a required heating load in accordance with an embodiment of the present disclosure.

TABLE 1

| | Indexing for Opening Angle of Temperature Door | |
|---|---|---|
| | 0 to 4 | 5 to 6 |
| Indexing for Controlled Air Flow Amount | Indexing for Required Heating Load | |
| 0 to 3 | 1 | 2 |
| 4 to 9 | 2 | 3 |

As shown in Table 1, amounts of controlled air flow passing through the blower step 400 are sorted into two steps represented by indexes of 0 to 3 and 4 to 9. An index value increased between 0 and 9 means that the amount of controlled air flow increases correspondingly.

In addition, as shown in Table 1, opening angles of the temperature door 300 are sorted into two steps represented by indexes of 0 to 4 and 5 to 6. The index of 0 means that the opening angle of the temperature door 300 is controlled such that a maximum amount of low-temperature air is contained in an introduced air, whereas the index of 6 means that the opening angle of the temperature door 300 is controlled such that a maximum amount of high-temperature air is contained in the introduced air.

As shown in Table 1, required heating loads according to opening angles of the temperature door 300 and controlled air flow amounts of the blower step 400 are defined by indexes of 1 to 3, respectively. An index value increased between 1 and 3 means that the required heating load increases correspondingly.

When the required heating load is calculated, the FATC 220 calculates an environmental condition according to the heating environment of the vehicle. To this end, the FATC 220 is configured to receive environment information of the vehicle through a plurality of sensors installed at the vehicle.

In order to measure environmental condition information, in an exemplary embodiment of the present disclosure, the FATC 220 receives detection signals from a solar radiation sensor (not shown) for detecting a solar radiation quantity, an outdoor temperature sensor (not shown) for detecting outdoor temperature, a cooling water temperature sensor (not shown), etc., and calculates an environmental condition of the vehicle performing heating, based on values of the detection signals.

Preferably, indexes representing environmental conditions of the vehicle are defined by 0 to 4, respectively. When the cooling water temperature is low, the solar radiation quantity is small, and the outdoor temperature is low, the index value of the calculated environmental condition approximates to 0. This index value means that the vehicle is in a low-temperature state. In a case contrary to the above case, the index value of the calculated environmental condition approximates to 4. This index value means that the vehicle is in a high-temperature state.

In an exemplary embodiment of the present disclosure, critical values of the cooling water temperature associated with the environmental condition of the vehicle may be set to three-step hysteresis which are included an extremely low temperature condition, a low temperature condition and a high temperature condition. In addition, the hysteresis of critical values of the outdoor temperature may set to a predetermined value. The hysteresis of critical values of the solar radiation quantity may set to a predetermined value.

Accordingly, when the cooling water temperature of the vehicle, the outdoor temperature, and the solar radiation quantity are equal to or lower than the hysteresis conditions thereof, respectively, the environmental condition of the vehicle is calculated to have an index of 0. Furthermore, when each of the outdoor temperature and the solar radiation quantity is higher than the predetermined critical value range, the index representing the vehicle environmental condition is incremented by 1. Meanwhile, for the cooling temperature, hystereses of two steps are set, as described above. Accordingly, the cooling water temperature is compared with each of the hystereses of two steps and, as such, the index representing the vehicle environmental condition is incremented by 1 whenever a cooling water temperature higher than the critical value range corresponding to each hysteresis is measured.

In brief, in accordance with the illustrated embodiment of the present disclosure, the cooling water temperature of the vehicle, the outdoor temperature, and the solar radiation quantity are compared with the predetermined critical value ranges, and each of the cooling water temperature of the vehicle, the outdoor temperature, and the solar radiation quantity is higher than the critical value range thereof, the index representing the vehicle environmental condition is incremented by 1. In this case, the index representing the vehicle environmental condition has a value of 0 to 4.

Figure 4:
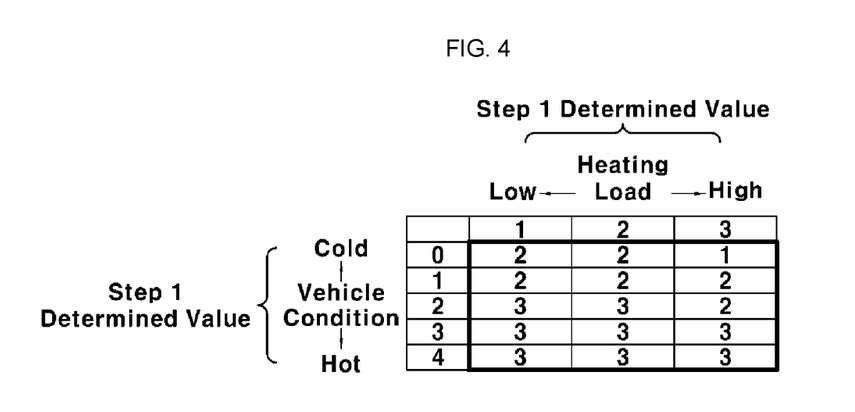
FIG. 4 is a table illustrating map data of final heating load values calculated through the method for determining a heating load in a hybrid electric vehicle in accordance with the illustrated exemplary embodiment of the present disclosure.

That is, the environmental condition of the vehicle in the present disclosure is a factor for adjusting the required heating load, and is applied as a basis for dividing hysteresis boundary conditions. The FATC 220 may create final heating load values having a format of 5×3 map data through combination of calculated required heating loads and calculated environmental conditions.

FIG. 4 illustrates final heating load values having a formant of 5×3 map data as a combination of required heating loads and environmental conditions calculated through the controller 200.

Referring to the illustrated required heating load map data, required heating loads as raw data are sorted into load conditions of three steps. Environmental conditions are represented as column data.

As described above, the environmental condition index has a value of 0 to 4. In connection with this, the value of the environmental condition index is determined in accordance with the cooling water temperature of the vehicle, the outdoor temperature, and the solar radiation quantity, which determine the environmental condition.

The map data configured as described above is used in adjusting a basic request engine torque calculated in accordance with a travel pattern input value from the user applied to the controller 200 of the present disclosure.

Preferably, the HCU 210 outputs a basic request engine torque in accordance with the travel pattern input value from the user. The output basic request engine torque is adjusted based on the final heating load value calculated by the FATC 220.

Figure 5:
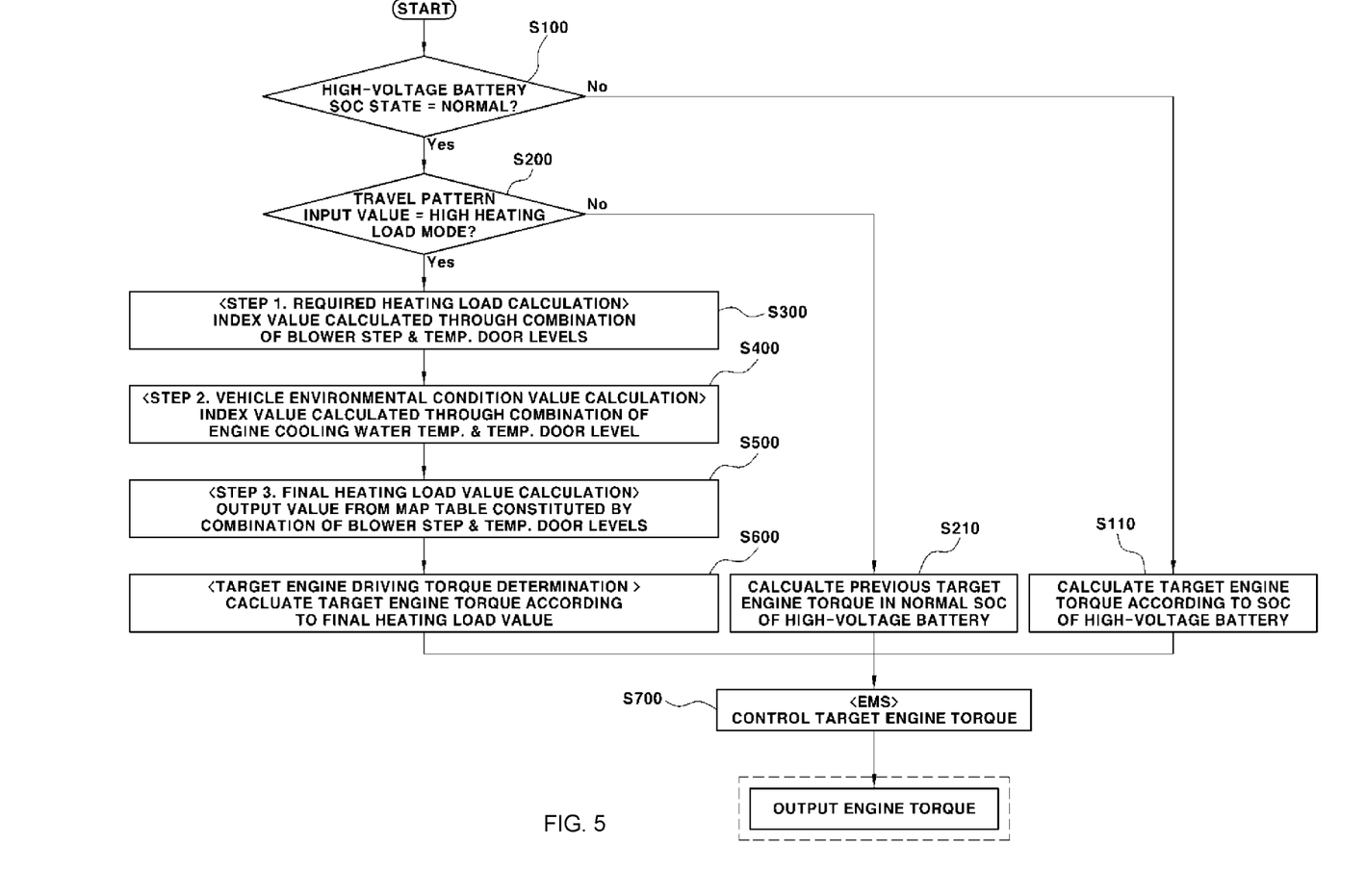
FIG. 5 is a flowchart of the method for determining a heating load in a hybrid electric vehicle in accordance with the illustrated exemplary embodiment of the present disclosure.

FIG. 5 illustrates a flowchart of a method for determining a heating load of a hybrid electric vehicle in accordance with an exemplary embodiment of the present disclosure.

The method includes operation S100 for first determining whether or not the SOC of a high-voltage battery is a normal state. When the SOC of the high-voltage battery is abnormal, a basic target engine torque according to the current SOC of the high-voltage battery is calculated. Preferably, when the SOC of the battery is measured to be an overcharge state (abnormal state), a basic target engine torque is calculated in order to maintain the engine 100 in an ON state for execution of recharging of the battery (S110).

Furthermore, the EMS 230 controls the engine 100 in order to drive the engine 100 by the basic target engine torque output in accordance with the SOC of the battery (S700).

As illustrated in FIG. 5, when the SOC of the high-voltage battery is determined to be normal in operation S100 of first determining the SOC of the high-voltage battery, whether or not there is a travel pattern input value from the user is determined (S200).

As operation of whether or not there is a travel pattern input value from the user, whether or not there is a heating request from the user in accordance with a travel pattern is determined (S200). When there is no heating request according to a travel pattern input value from the user, a previous target engine torque is calculated based on the current normal SOC of the high-voltage battery (S210). In accordance with the calculated previous target engine torque, the torque of the engine 100 is controlled (S700).

On the contrary, upon determining that there is a heating request in accordance with a travel pattern input value from the user, the controller 200 may output a basic request engine torque calculated through the controller 200 in accordance with the input travel pattern.

The basic request engine torque calculated through the controller 200 in accordance with the travel pattern input from the user and the heating request of the user may be determined in accordance with an exemplary embodiment of the present disclosure, as follows.

The basic request engine torque according to the travel pattern from the user is output, taking into consideration the consumed electric power amount of an auxiliary battery, an acceleration desire of the user, the travel load and the average speed of the vehicle, under the condition that whether or not the user desires heating has been determined.

That is, when the travel pattern from the user is taken into consideration, determination as to whether or not the user desires heating is carried out. When the difference between outdoor temperature and a predetermined temperature set by the FATC 220 is equal to or greater than a predetermined value, it is determined that there is a heating request.

In addition, when there is a heating request, the controller 200 calculates a basic request engine torque output in accordance with the travel pattern from the user. The basic request engine torque is calculated, taking into consideration whether or not electric power load is equal to or greater than a predetermined value, through calculation of the consumed electric power amount of the auxiliary battery. When the consumed electric power amount of the auxiliary battery is equal to or greater than a predetermined value, a higher output of the engine 100 may be set in order to prevent an exhausted SOC.

In addition, the controller 200 may set the basic request engine torque, taking an acceleration desire of the user into consideration. When an input value from an acceleration pedal sensor (APS) is equal to or greater than a predetermined value, it is determined that there is an acceleration desire of the user or a high travel load. In this case, a higher output of the engine 100 may be set.

Furthermore, the controller 200 calculates an average speed of the vehicle, and determines an increase in travel load when the calculated average speed increases. In this case, a higher basic request engine torque may be set.

Preferably, the consumed electric power amount of the auxiliary battery is determined first. When the determined consumed electric power amount of the auxiliary battery is lower than the predetermined value, whether or not there is an acceleration desire of the user and whether or not there is a high travel load are sequentially determined. Upon finally determining that there is no acceleration desire of the user and there is no high travel load, the basic request engine torque may be calculated based on the average speed of the vehicle.

As described above, the controller 200 in the present disclosure determines a heating request in accordance with the travel pattern input from the user, and calculates a basic request engine torque according to the input travel pattern (S200).

Upon determining, in accordance with the travel pattern input from the user, that there is a heating request (S200), the FATC 220 calculates a required heating load according to the travel pattern input (S300).

The required heating load is calculated based on the controlled air flow amount introduced through the blower step 400 and the opening angle of the temperature door 300. The required heating load may have an index selected from 3-step indexes in accordance with the level of the load.

Preferably, in the illustrated embodiment of the present disclosure, controlled air flow amounts passing through the blower step 400 are sorted into two steps, and opening angles of the temperature door 300 are also sorted into two steps, and, as such, load levels are defined by 3-step indexes, respectively.

After calculation of the required heating load as described above, the FATC 200 calculates a factor according to the environmental condition of the vehicle (S400).

The environmental condition of the vehicle is calculated based on values measured through a plurality of sensors installed at the vehicle. In the illustrated embodiment of the present disclosure, the environmental condition is calculated through a combination of the cooling water temperature of the engine 100, the solar radiation quantity and outdoor temperature of the vehicle.

After the required heating load and the environmental condition are calculated as described above, map data to be stored in the controller 200 may be created through a combination of the calculated required heating load and the calculated environmental condition. As illustrated in FIG. 4, there may be map data of 5 columns and 3 rows having final heating load values (S500).

A final heating load value is set through the calculated map data. Based on the calculated final heating load value, adjustment of the basic request engine torque value output in accordance with the travel pattern input from the user is carried out. Accordingly, a request engine torque adjusted taking into consideration the load according to the heating request of the user may be calculated (S600).

The request engine torque adjusted as described above is controlled through the EMS 230, to drive the engine 100 (S700).

The controller 200 according to an exemplary embodiment of the present disclosure may be a processor (e.g., computer, microprocessor, CPU, ASIC, circuitry, etc.). The controller 200 may be implemented through a non-transitory memory configured to store data with respect to algorithms configured to control operations of various components in the vehicle or software instructions reproducing the algorithms, and a processor configured to perform the operations described above by using the data stored in the memory. Herein, the memory and the processor may be implemented as separate semiconductor circuits. Alternatively, the memory and the processor may be implemented as a single integrated semiconductor circuit. The processor may embody one or more processor(s).

As described above, the present disclosure may be configured to adjust the basic request engine torque calculated in accordance with the travel pattern input value from the user, based on the final heating load value. As the engine 100 is driven in accordance with the adjusted request engine torque, it may be possible to achieve hybrid travel in which unnecessary driving of the engine 100 caused by a heating load is minimized.

The present disclosure may obtain the following effects in accordance with the illustrated embodiments, the above-described configurations, the combinations of the configurations, and use relations thereof.

In accordance with the present disclosure, a final heating load value is calculated through calculation of a required heating load and combination of the calculated required heating load with an environment of the vehicle and, as such, an accurate heating load meeting the request of the user is calculated. Accordingly, an engine torque meeting the heating load may be reflected and, as such, the air-fuel ratio is enhanced.

In addition, the present disclosure provides a heating load substantially similar to a heating condition requested by the user and, as such, the travel environment of the user is improved.

The inventive concept(s) has/have been described in detail with reference to preferred embodiments of the present disclosure. However, it will be appreciated by those skill in the art that changes may be made in these embodiments without departing from the principles and spirit of the present disclosure, the scope of which is defined in the appended claims and their equivalents.

What is claimed is:

1. A method for determining a heating load of a hybrid electric vehicle, comprising steps of:
    determining, by a controller, a state of charge (SOC) of a high-voltage battery;
    determining, by the controller, whether or not there is a heating request, based on a travel pattern input, when the SOC of the high-voltage battery is normal;
    calculating, by the controller, a required heating load according to the travel pattern input when it is determined that there is a heating request;
    calculating, by the controller, an environmental condition according to environment of the vehicle when it is determined that there is a heating request;

calculating, by the controller, a final heating load value based on a combination of the calculated required heating load and the environmental condition of the vehicle; and adjusting, by the controller, a basic request engine torque determined by the travel pattern input, based on the calculated final heating load value, and controlling driving of an engine in response to the adjusted basic request engine torque, wherein the basic request engine torque determined by the travel pattern input is calculated based on at least one of a consumed electric power amount of an auxiliary battery, an acceleration desire of a user, a travel load, and an average speed of the vehicle.

2. The method according to claim 1, wherein, in the step of calculating the environmental condition according to the environment of the vehicle, the environmental condition is calculated based on a combination of a cooling water temperature of the engine, a solar radiation quantity, and outdoor temperature of the vehicle.

3. The method according to claim 1, wherein, in the step of calculating the required heating load, the required heating load is calculated based on a controlled air flow amount through a blower step and an opening angle of a temperature door.

4. The method according to claim 3, wherein the blower step is configured to control the controlled air flow amount to be discharged into a passenger compartment, and the temperature door is configured to control an amount of high-temperature air heated through the heater core and an amount of low-temperature air introduced from outside of the vehicle.

5. The method according to claim 1, wherein, in the step of calculating the final heating load value through the combination of the calculated required heating load and the environmental condition of the vehicle, the required heating load and the environmental condition of the vehicle are combined to constitute a map table.

6. The method according to claim 5, wherein the final heating load value is determined in the map table by using the required heating load as a column factor and using the environmental condition of the vehicle as a row factor.

7. The method according to claim 1, wherein the heating request is determined to be present when a difference between outdoor temperature of the vehicle and a set temperature of a fully automatic temperature control (FATC) unit is greater than a predetermined value.

8. The method according to claim 1, wherein the controller comprises a fully automatic temperature control (FATC) unit, an engine management system (EMS), and a hybrid control unit (HCU).

9. The method according to claim 1, further comprising calculating a target engine torque value according to the SOC of the high-voltage battery when the SOC of the high-voltage battery is determined to be abnormal in the step of determining the SOC of the high-voltage battery.

10. The method according to claim 1, further comprising calculating a target engine torque value according to the SOC of the high-voltage battery when it is determined that there is no heating request in the step of determining whether or not there is a heating request.

* * * * *